United States Patent [19]

Land et al.

[11] Patent Number: 5,448,382
[45] Date of Patent: Sep. 5, 1995

[54] NONLINEAR OPTICAL SCATTERING SCREEN VIEWER

[75] Inventors: Peter L. Land; Mark G. Schmitt, both of Dayton, Ohio

[73] Assignee: The United States of America as represented by the Secretary of the Air Force, Washington, D.C.

[21] Appl. No.: 381,100

[22] Filed: Jan. 27, 1995

Related U.S. Application Data

[63] Continuation-in-part of Ser. No. 116,741, Sep. 7, 1993, abandoned.

[51] Int. Cl.⁶ ................... G02F 1/13; G02F 1/1335
[52] U.S. Cl. ........................ 359/43; 359/40; 359/41; 359/51
[58] Field of Search .............. 359/44, 45, 43, 40, 359/41, 52, 241, 614, 615, 51

[56] References Cited

U.S. PATENT DOCUMENTS

| | | | |
|---|---|---|---|
| 3,792,916 | 2/1974 | Sarna | 350/163 |
| 4,436,398 | 3/1984 | Endo et al. | 354/476 |
| 4,765,719 | 8/1988 | Fergason | 350/350 |
| 4,909,609 | 3/1990 | McDowell | 350/354 |
| 4,912,822 | 4/1990 | Zdeblick et al. | 29/25.35 |
| 4,917,476 | 4/1990 | Makh et al. | 350/351 |
| 5,081,542 | 1/1992 | Efron et al. | 359/41 |
| 5,086,549 | 2/1992 | Gualtieri | 29/23.35 |
| 5,129,132 | 7/1992 | Zdeblick et al. | 29/25.35 |
| 5,233,445 | 8/1993 | Kamath et al. | 359/51 |
| 5,317,454 | 5/1994 | Sharp et al. | 359/886 |

FOREIGN PATENT DOCUMENTS 59-34517  2/1984  Japan ........................ 359/44

*Primary Examiner*—Anita Pellman Gross
*Assistant Examiner*—Charles Miller
*Attorney, Agent, or Firm*—Bobby D. Scearce; Thomas L. Kundert

[57] ABSTRACT

An apparatus and method for viewing a scene where a portion of the field of view may exhibit excessive brightness, comprising a nonlinear optical scattering screen for which the scattering coefficient of the screen decreases rapidly with increasing light intensity above a threshold intensity. The scene is viewed by imaging light from the scene onto the nonlinear scattering screen and then reimaging the light scattered by the screen onto human retinas or other light detectors.

21 Claims, 5 Drawing Sheets

NONLINEAR OPTICAL SCATTERING SCREEN VIEWER

RIGHTS OF THE GOVERNMENT

The invention described herein may be manufactured and used by or for the Government of the United States for all governmental purposes without the payment of any royalty.

This application is a continuation-in-part of application Ser. No. 08/116,744, filed on Sep. 7, 1993, now abandoned.

FIELD OF THE INVENTION

The present invention relates generally to technology for the protection of eyes and artificial optical sensors from bright sources within their field of view, and more specifically to passive devices making use of light backscattered from light modulating materials in order to provide such protection while affording a clear view of a scene including a very bright light source.

BACKGROUND OF THE INVENTION

It is a common occurrence for there to be a requirement to observe a scene which may contain one or more sources bright enough to damage or temporarily blind eyes or an artificial optical sensor. Workers in many scientific or industrial environments are often subject to hazardous exposure to intense light from optical lasers, arc welding equipment, or other sources. Protective equipment often decreases the worker's ability to perceive his environment and thereby decreases his productivity and increases his danger from other hazards in the environment. A particularly common example is that of manual arc welding, where the user's eyes must be protected from the excessively bright arc, and yet at the same time the user must be allowed to see the material he is working with.

Similarly, the presence of a hostile laser is a potential danger to present and future military operations. Many military systems rely on sensitive optical detectors or on the human eye enhanced by light gathering optics. The very sensitivity of the detector and the light gathering power of the optics renders the eye or the detector vulnerable to damage from hostile laser light. Methods of protection must address both the prevention of damage or injury and the continuing function of an optical system when it is illuminated by a threat laser.

Current methods of dealing with very bright sources in a field of view have serious problems and limitations. In manual arc welding, for example, the welder positions a hood with a light absorbing window in front of his eyes for protection from the excessively bright arc. The window provides a uniform attenuation which severely reduces or eliminates viewing of the work and surroundings until the arc is struck, and continues to restrict the field of view after the arc is struck.

In the past few years, electro-optically switched windows for use as eye protection during arc welding have been developed which are clear until an arc is struck and become uniformly absorbing within microseconds to milliseconds after light from the arc is detected. U.S. Pat. No. Re. 29,684 is an example of such a protective device. It relies on a photodetector to detect the lighting of the arc, a circuit to apply a voltage across the device when the lighting of the arc is detected, and a layer of liquid crystal material sandwiched between a pair of polarizers so arranged that when a suitable electrical potential is established the assembly will change from a uniform light transmitting condition to a uniform largely absorbing condition. Since such a switching process is "active"; power sources, light detectors, and electronic circuits are required. This adds to the cost and complexity of the window. And, as in the case of the absorbing window of a simple welding hood, the field of view of the welder is restricted because uniform attenuation of the light does nothing to reduce the contrast in apparent brightness between the arc and the remainder of the field of view.

Measures for the protection of eyes and sensors against lasers include the use of one or more fixed optical filters capable of excluding narrow spectral lines which may be emitted by the most obvious laser threats. However, this approach is not suitable for use against agile military lasers, which can operate at various wavelengths of the optical spectrum. The effectiveness of fixed interference filters is also limited because their optical density at a threat wavelength may be greatly reduced when light is incident from angles different from a specific design angle; these filters change the apparent color of a scene; and as the number of filtered lines and the optical density of a filter increases, the scene apparent brightness decreases, reducing visibility.

Various liquids and solids exist, including solutions or suspensions of limiting materials, which when placed near or at an intermediate focal surface of an optical system will transmit scenes to a final focal surface with little distortion and attenuation when the scene contains no excessively bright source, but which will very substantially attenuate the intensity occurring at a final focal surface (at a detector or eye of an observer) when an excessively bright source is encountered. The attenuation may have a nonlinear dependence on intensity and/or fluence and may be a combined effect of absorption, reflection, scattering and refractive defocusing. This approach is most effective for short pulse lasers; when lasers emit continuously, the scattered, reflected and defocused light may obscure the scene for an unacceptable period of time. In addition, the backscatter and reflection from these protective devices may be a problem in some applications.

Active electro-optical and mechanical devices can limit light intensity by switching the transmission state of an optical system temporally, spectrally or spatially. These devices are relatively expensive and encumbering, and the broader their capability of dealing with a threat the more encumbering they may be to the user.

In view of the foregoing, there is a continuing need for a simple, low-cost, light-weight, passive device which permits an optical sensor to better maintain its desired function by reducing the apparent brightness of a very bright source in an otherwise moderately bright field of view, which provides protection for eyes or artificial optical sensors against bright sources in the field of view over the entire optical wavelength band, which does not change the color of a scene, which is not a strong retroreflector of bright sources, and which does not block ordinary vision or obscure the field of view with excessive unwanted scattered or refracted light. The present invention satisfies such needs.

SUMMARY OF THE INVENTION

The present invention is concerned with viewing a scene where a light source within the field of view may exhibit excessive brightness. This invention involves the construction and use of a nonlinear optical scattering screen (NLOSS). The NLOSS is composed of a material which efficiently scatters low intensity light, which can be collected and focused, while transmitting (dumping) a much greater portion of high intensity light. The scene is viewed by reimaging the image of the scene, as scattered by the NLOSS, onto a human retina or another light detector.

The term "low intensity light" as used herein refers to an intensity which when focused on the NLOSS will not cause a substantial change in scattering, absorption and transmission for a particular optical system design, and which will neither damage the optical detector being protected nor cause poor viewing conditions as a result of excessive contrast. Similarly, the terms "high intensity light" or "excessive brightness" concern intensities which when focused on the NLOSS will cause a substantial change in scattering, absorption and transmission for a particular optical system design, which without intervention would damage the optical detector being protected or cause poor viewing conditions as a result of excessive contrast. The incident intensity level or "threshold value of brightness" which can cause damage depends not only on the sensor being protected but also on the optics which gathers light from the scene being viewed and which reimage the image scattered by the NLOSS. For any given application of the NLOSS, protected sensor and associated optics, there will be a threshold value of brightness or intensity level which will cause sensor damage.

A simple NLOSS is an inhomogeneous layer consisting of optical wavelength size inclusions of one transparent material within a matrix of another transparent material. For low incident intensities the refractive index of the different materials are substantially mismatched so that the film is opaque and highly scattering. At high incident intensities sufficient radiation is absorbed, either in the NLOSS itself or in an adjacent material to cause the NLOSS to be heated within the area illuminated by the high intensity radiation. The two primary materials comprising the NLOSS are chosen so that at the higher temperature, the local refractive index of one of the materials changes to match the refractive index of the other material and the layer becomes locally transparent. Hence the radiation from the bright source is substantially transmitted while the radiation from the low brightness background, which strikes the NLOSS where it remains translucent, is substantially scattered. The light scattered from the NLOSS is collected, reimaged, and presented to the eye or an artificial light detector.

The scattering coefficient within a small area of the NLOSS decreases substantially and when the associated material is heated through a specified transition temperature by the focused radiation from a bright source. The transition time depends on many factors, including the ambient temperature, the phase change temperature, the local intensity of light incident on the NLOSS, the absorption coefficient, thickness, and thermal properties of the NLOSS and adjacent structures. These factors determine energy absorption and dissipation rates, the temperature change rate within the film, the time required for the desired onset of increased local transmission (reduced scattering and absorption) and also the time at which the area of reduced scattering and eventual obscuration within a scene would spread beyond an acceptable size if nothing were done to alter the situation.

The light from a bright source which is transmitted through the NLOSS propagates into an optical absorption chamber. The absorption chamber may be thermally connected to a heat sink or exchanger in order to dispose of excessive heat.

Since the NLOSS scatters light over a wide solid angle and since only that part of the light scattered directly into a collecting optic is wanted, other surfaces capable of scattering light coming from the NLOSS into the collection optic and on to the detector must be highly absorbing or blocked from view by absorbing baffles or shields.

BRIEF DESCRIPTION OF THE DRAWINGS

FIG. 4 shows a third configuration for an NLOSS viewer of FIG. 3a.

DETAILED DESCRIPTION OF THE INVENTION

The present invention involves the use and construction of a nonlinear optical scattering screen (NLOSS) for which the scattering coefficient of the screen decreases rapidly with increasing light intensity. The scene is viewed by reimaging the image scattered by the NLOSS onto a human retina or another light detector.

Figure 1A:
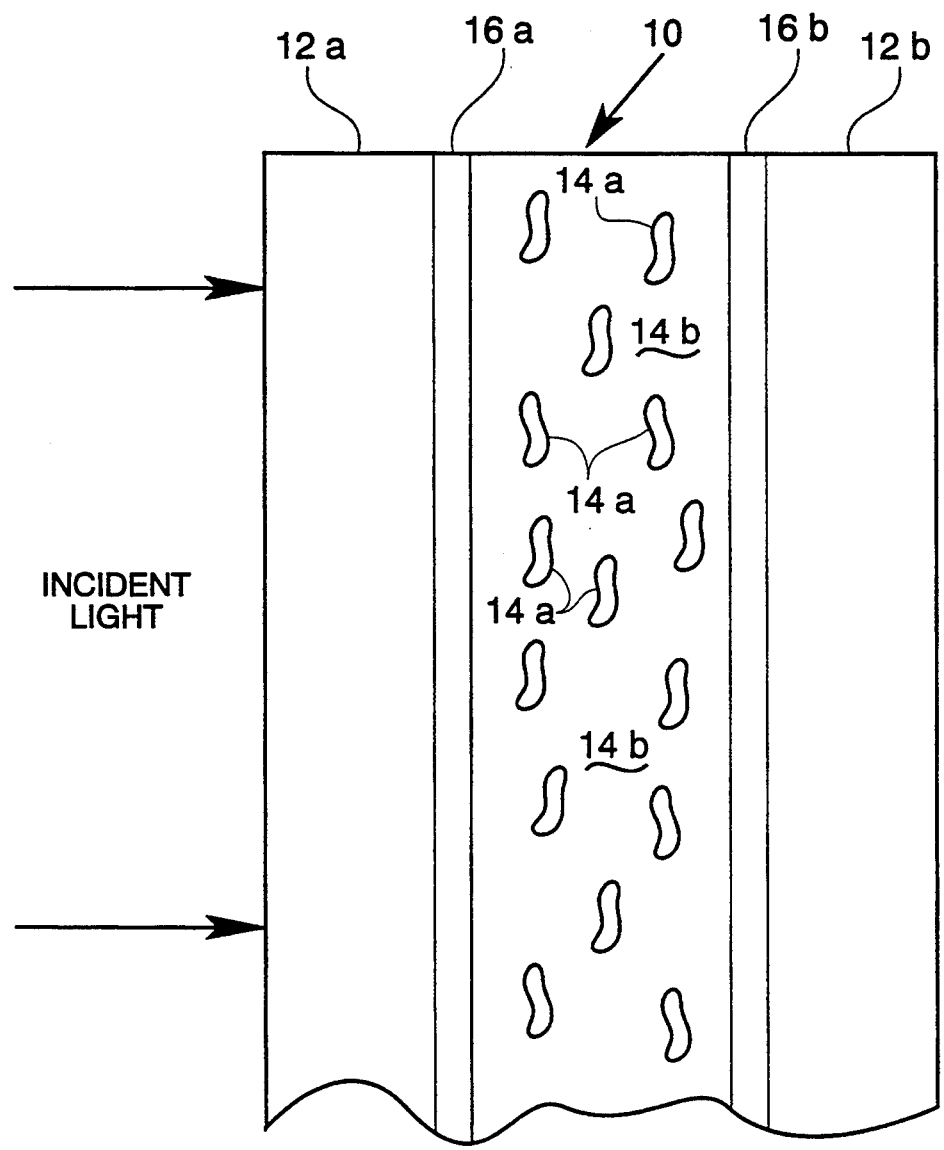
FIG. 1a is a cross sectional schematic view of a nonlinear optical scattering screen (NLOSS) of the present invention.

FIG. 1a is a cross sectional schematic view of an exemplary nonlinear optical scattering screen (NLOSS). A scattering layer 10 is mounted between transparent substrates 12a and 12b. Optionally, 12a may be omitted so that layer 10 is supported by 12b alone. In a preferred embodiment, the scattering layer is a polymer dispersed liquid crystal (PDLC) film comprising a nematic liquid crystal 14a dispersed in small droplets throughout a polymer matrix 14b. A suitable PDLC film can be formed using a mixture consisting of 30% E7 (a nematic liquid crystal mixture) and 70% Norland 60 optical adhesive. Norland 60 is a UV curable epoxy resin commercially available from Norland Products, Inc., New Brunswick, N.J. E7 is a 4-component eutectic mixture consisting of cyano bi- and terphenyls and is commercially available from EM Chemicals, Hawthorne, N.Y. E7 is readily soluble in Norland 60.

Figure 1B:
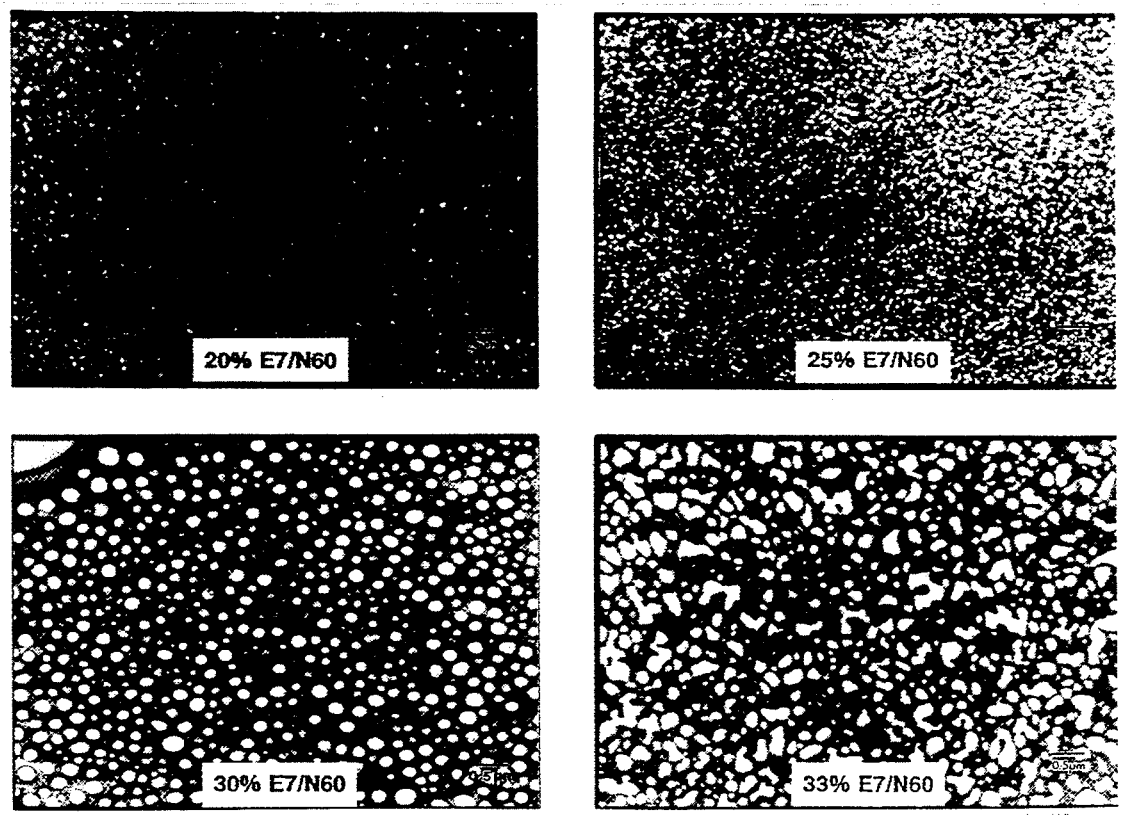
FIG. 1b shows transmission electron micrographs of the microstructure of liquid crystal polymer composites formed after curing various mixtures of E7 liquid crystal material and Norland 60 optical cement.

FIG. 1b illustrates some of the microstructure types that have been produced in PDLC materials. These types and others, such as elliptical inclusions can be tailored for use in NLOSS films. The photographs of FIG. 1b are reproduced from FIG. 22 of USAF report WL-TR-92-4074, by M. J. Sansone, entitled "Non-Linear Organics," AD Number 146623, the teachings of which are incorporated herein by reference; this report shows some of the effects of composition and curing conditions on the various properties of LCC (PDLC) films that relate to dynamic displays and electrooptical devices.

PDLC material is formed by dispersing or dissolving a liquid crystal in a prepolymer and then curing or setting (See U.S. Pat. No. 4,890,902) the system either thermally or photochemically. Such PDLC material as would be useful in the NLOSS may contain other dissolved materials, such as a pleochroic, dichroic or isotropic dye, for example. The droplets 14a may be shaped within the matrix 14b. (See U.S. Pat. Nos. 4,890,902; 4,688,900; 4,685,771; 4,673,255; 4,869,847; and 5,084,203; as well as F. Simoni et al. Appl. Phys. Lett. 54, 10, p. 896 (1989) and Appl. Phys. Lett. 57, No. 19, p. 1949(1990) incorporated by reference.) A liquid crystal phase segregates as polymerization, cross linking, or thermosetting proceeds due to diminishing solubility of the liquid crystal in the polymer. The result may be an intended finely dispersed, randomly oriented, liquid crystal phase in a polymer matrix.

A nematic liquid crystal film has a well defined transition temperature between an ordered nematic phase and an isotropic phase with refractive indices varying between the two phases: however, when E7 liquid crystal is dispersed in Norland 60 the transition temperature range has been observed to broaden.

Preferably in the NLOSS of the present invention, the refractive index of the polymer matrix and the nematic liquid crystal droplets are substantially mismatched below the transition temperature and threshold value of brightness for switching from scattering to transmitting as previously described. Internal reflections and refractions occur as the incident light encounters each polymer liquid crystal boundary. The PDLC scattering layer is therefore translucent being highly scattering and slightly absorbing.

High incident intensities at and above the threshold value of the NLOSS scattering-to-transmitting-transition may result when a bright source exists within a field of view. Energy is absorbed locally heating the scattering layer. When the droplets of liquid crystal in the affected region of the scattering layer are heated above their nematic to isotropic transition temperature (the onset of which may be a lower temperature for included droplets than for neat liquid crystal material), the liquid crystal in the affected region undergoes a phase change to the isotropic state. The liquid crystal and the material making up the polymer matrix are chosen so that the refractive index of the liquid crystal in the isotropic state matches that of the polymer matrix. The affected region of the scattering layer becomes optically homogeneous and therefore transparent. This causes a large reduction in scattering, and indirectly in absorption, from the affected region of the scattering layer. The remainder of the scattering layer, however, remains highly scattering. The reduction in scattering from the affected region reduces the intensity of the light from the affected region which is collected and focused onto either the observer's retina or an optical detector, while the quantity of light collected from the remainder of the scattering surface is unaffected. Hence light from the bright source is moderated or reduced in apparent brightness without reducing the visibility of the remainder of the scene.

The E7 liquid crystal is a uniaxial positive system with high birefringence ($n_e=1.746$, $n_O=1.522$, $n_{av}=(2n_O+n_e)/3=1.597$). See "Large Kerr effects in transparent encapsulated liquid crystals", M. J. Sansone et al., J. Appl. Phys., 67, No. 9, p. 4253 (1990). The refractive index for Norland 60 is 1.56. Minor composition variations may be used to improve matching of the isotropic liquid crystal refractive index and that of the matrix material.

The morphology of the PDLC including the size, shape and internal configuration and anchoring of the liquid crystal droplets, the and the optical index differences of the liquid crystal molecules and the matrix material will influence design factors such as film thickness, and performance factors of the NLOSS such as image resolution, contrast, switching speed and dynamic range of operation. For example, the scattering for a given film thickness, when the liquid crystal is in a nematic state, is greatest when the size or average diameter of the droplets is approximately equal to the wavelength of the light to be scattered. The distribution, shape and orientation of droplets and internal orientation of the included liquid crystal material can be used to cause a direction of preferred scattering and thus is a means of increasing the amount of light scattered toward a collecting optic. References such as J. L. West, *Mol. Liq. Cryst.*, "Phase Separation of Liquid Crystals in Polymers", P. 157, pp. 427–441 (1982), J. West, "Polymer Dispersed Liquid Crystals," *Advances in Liquid Crystal Polymers*, R. Weiss and C. Ober, eds., ACS Symposium Series (1990) (incorporated by reference), and above referenced patents discuss techniques for preparation of PDLC materials and the control of their morphology.

One or two layers 16a or 16b for absorbing incident light may be included in the NLOSS in contact with the scattering layer. Preferably, the layers 16a and 16b consist of a film of a largely transparent but still slightly absorbent material, such as indium tin oxide, gold, aluminum or $Cu_{2-x}S$. ($Cu_{2-x}S$ is a material for which the absorption and reflection in the range 0.8 to 1.2 microns decreases with an increase in temperature from 25 to 75 degrees centigrade. Reference Walter J. Wild et al., "Handbook of Phase Transition Sulfides, Selenides, and Tellurides", (U) GACIAC HB-84-02, ADA146, July 1984.) The layers 16a and 16b function to aid in locally heating the scattering layer in regions where incident light is relatively intense and exceeds the previously described scattering to transmitting threshold.

An absorber material such as carbon black dye may be dispersed through one or both phases of the scattering layer to help provide a local heating effect. Alternatively a reversible-bleachable thermochromic or reversible photochromic-thermally-bleachable absorber such as spiropyran, (6-Nitro-1′,2′,3′-trimethylspiro-[2H-1-benzopyran-2,2′-indoline]), which colors blue under ultraviolet and bleaches when heated to about 60 degrees C, may be dispersed in the scattering layer to help provide a transient increase in the local heating effect for a source peaking in the blue part of the spectrum.

Absorbers in layer 10 may eliminate the need for separate absorbing layers 16a and 16b. In such a case the scattering layer may exist as a free standing film, supported by a frame. The scattering layer may also be supported on a single substrate 12b as opposed to being sandwiched between substrates 12a and 12b, and film 16b may be utilized or omitted. Films, not shown, may be added to the NLOSS structure for other purposes such as protective or antireflective coatings.

Layers 16a and 16b may be selected to be electrically conducting in order to apply electrical bias to the scattering layer during curing, or after curing is complete, as a means of enhancing the performance of an NLOSS.

Figure 2:
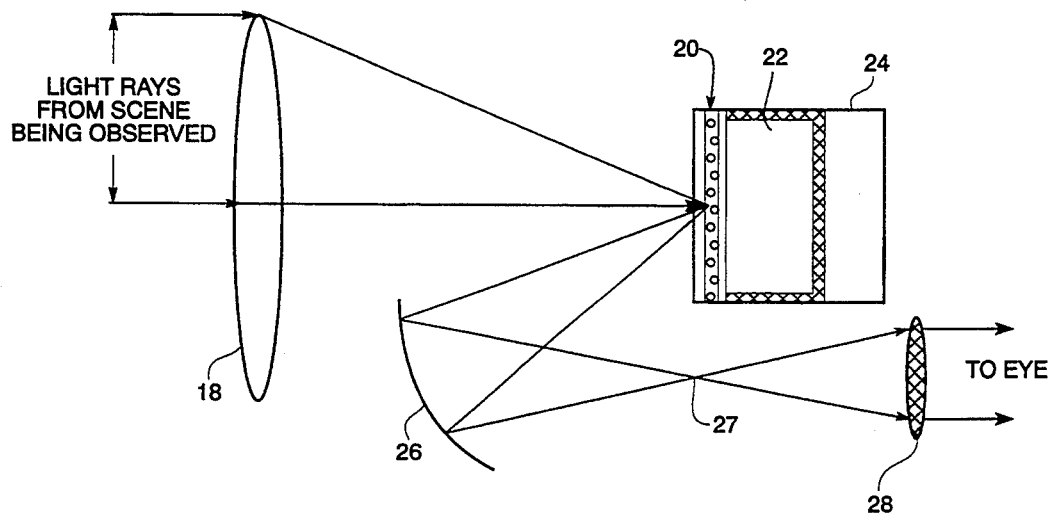
FIG. 2 is a schematic of one half of a light-weight binocular viewer using the NLOSS and showing paths of light rays through the viewer.

FIG. 2 is a schematic of one half of a light-weight binocular viewer using the NLOSS invention as discussed above. Light enters through an objective lens 18 which causes the light to be is focused on the NLOSS 20. Light transmitted by the NLOSS is received by an absorption chamber 22 designed to prevent incident light from being scattered or reflected back to the NLOSS. The absorption chamber is thermally connected to a heat sink and/or exchanger 24 to dissipate the heat produced by the absorbed light. Light scattered by the NLOSS is collected by a concave mirror 26. Eyepiece or exit lens 28 located beyond the focus 27 of the mirror 26 relays an upright real image of the scene to the eye of the observer. The entire structure as shown may be provided for each eye, or a viewer may have a single common objective lens and NLOSS with elements 26 and 28 being duplicated at opposing positions with respect to the major axis of the viewer.

The space between the relay mirror and the eye may be used for auxiliary optical switches, filters, and/or a field lens. The space ahead of the objective lens may be used for a protective window, a switchable electro-optical window or a neutral density or spectrally selective filter, as may the space following the exit lens. The inclusion and location of auxiliary elements depend on the desired function of the NLOSS viewer.

For example, if spiropyran or a material with similar characteristics is included in layer 10, one option is to admit some of the ultraviolet emitted by arc welding to the NLOSS to temporarily promote blue absorption and presumably more rapid heating of the NLOSS through the scattering to transmitting transition temperature, and then to filter out the harmful ultraviolet before the light reaches the welder's eye or another detector.

Figure 3A:
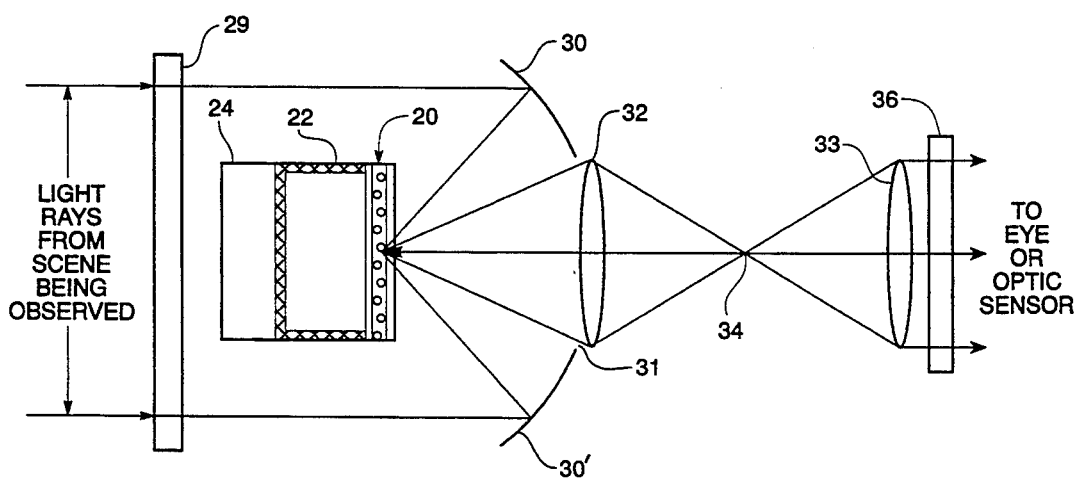
FIG. 3a shows a second configuration for an NLOSS viewer.

FIG. 3a shows a possible configuration of an NLOSS viewer. Light from the scene being viewed enters through an entrance window 29. Concave mirror 30 then focuses the light onto the NLOSS 20. Light transmitted through the NLOSS is received by an absorption chamber 22 thermally connected to a heat sink and/or exchanger 24. A portion of the light scattered by the NLOSS passes through a central aperture 31 in mirror 30 and is collected by a relay lens 32 and sent through an eyepiece lens 33 located beyond the focus 34 of the relay lens. The light rays suitable to producing an upright image pass through an exit window 36 to be intercepted by an eye or some other optical sensor. The windows may include filters or other auxiliary devices as may be required. Optionally a detector array may be located at the focus 34 and lens 33 and window 36 may then be omitted. The interior of the viewer enclosure and mounting structures, not shown, are constructed and finished to be highly absorbing, and baffles may be included as needed.

Figure 3B:
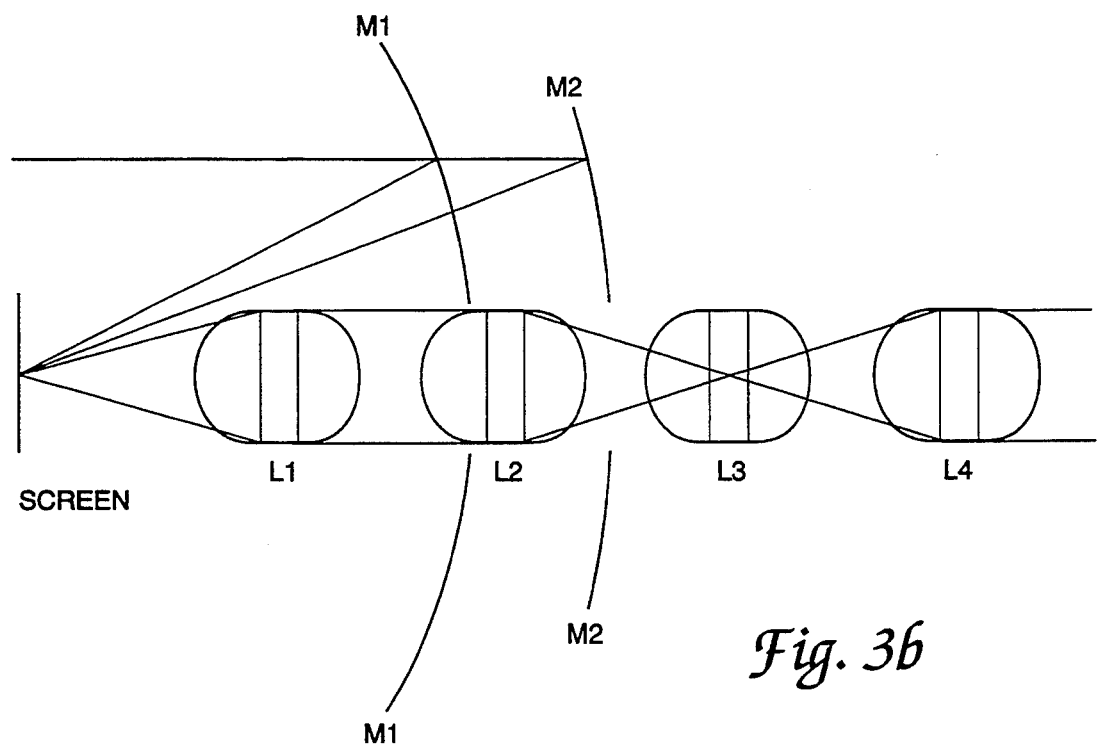
FIG. 3b shows a specific embodiment for the NLOSS viewer.

FIG. 3b shows an example where specific optical elements are utilized in the general design of FIG. 3a. Half of the viewer is shown with entrance and exit window and optical element supports omitted. This NLOSS system design permits optional choice from one of two mirrors and uses a set of identical lenses from the 1992 Edmunds Scientific Catalogue. Cat. No. P43,468 and P43,689 are first surface mirrors with D=35 mm and F.L.=35 mm and D=50 mm and F.L.=25 mm both with thickness 6 mm. The lenses are Hasting triplet aeromats Cat. No. P36,187 with diameter 8 mm and Eff. F.L=12.5 mm Back F.L. 9.9 mm, Center Thickness 7.18 mm, Edge Thickness 5.41 mm, R1=9.48=-R4 and R2=4.66=-R3. The distance between the NLOSS and first principal plane (principle planes are indicated by vertical lines within the acromats) of the first lens and between principal planes of adjacent lenses is the F.L., 12.5 mm. The drawing is scaled 1 inch =1 mm. The screen is located at the focal plane of the mirrors so that the system is focused at infinity. By increasing the distance from the mirror (note only one of the two shown are meant to be used) to the screen the system can be imaged to a working distance such as 50 cm. Thus the object distance is =50 cm and the image distance, s', is 2.63 cm for the 25 mm F.L. mirror and 3.76 mm for the 35 mm mirror. The screen size determines the aperture or FOV. Thus a 1 mm or a 2 mm square screen provides FOV of 21.5 or 41.6 degrees, repectively for the 50 mm F.L. mirror and 15.1 and 29.7 degrees respectively for the 35 mm mirror when the system is focused at 50 cm. The magnification which is less than unity as drawn can be modified by changing the spacing between the first, second and third lenses. Lens L3 is a field lens included to reduce vignetting. Illustrated is single incident light ray parallel to the axis of the optic system; this is collected and scattered by the screen and a scattered ray pair is traced through the lens system. The exit pupil is the image of L1 formed 12.5 cm from the second principle plane of L4. If image quality is not sufficient the collecting mirror might be replaced by an aspherically corrected mirror, or the entrance window might be a correcting lens as in a Schmidt camera or viewer. Also here as in all other designs, the NLOSS may be curved to better fit the focal surface of the optical system preceding and following the NLOSS.

Figure 4:
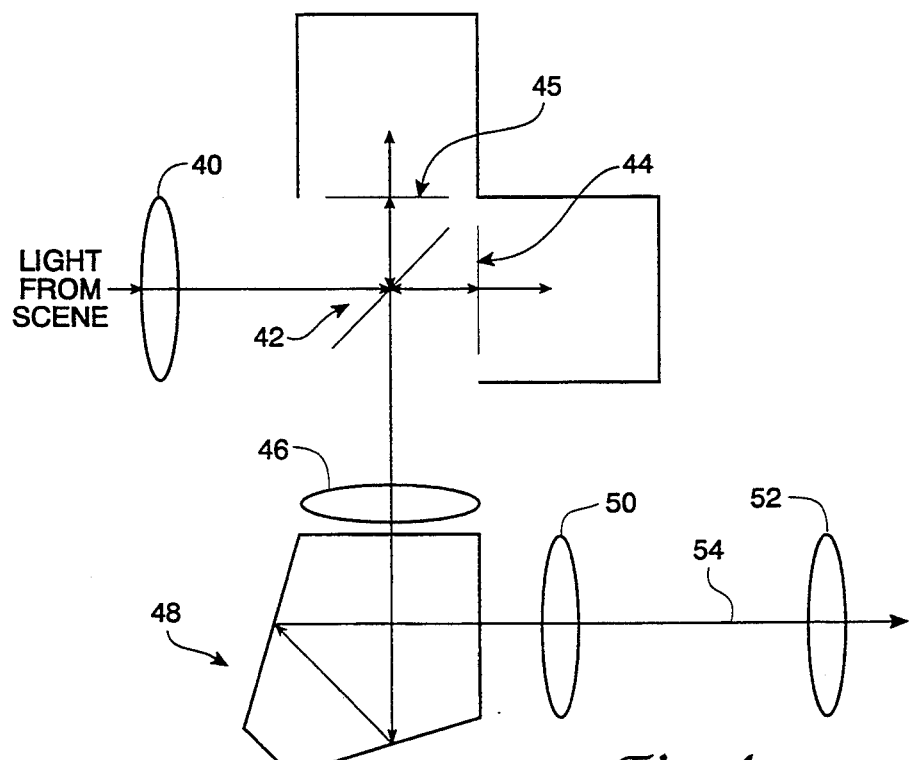

FIG. 4 shows a third arrangement for an optical viewer employing an NLOSS. Light from the scene being viewed enters through an objective lens 40. A beam splitter 42 then divides the light and sends it to a pair of NLOSS assemblies 44 and 45 each consisting of an NLOSS (one may be omitted optionally) and associated absorbing chamber. A fraction of the light scattered by the pair of NLOSS passes through or is reflected by the beam splitter, collected by a relay lens 46, and passes through a pentaprism 48 so that the path of the light upon exiting the prism is at a right angle to the path of the light as it entered the prism. The light then passes through a second relay lens 50 and an eyepiece lens 52, located beyond the focus 54 of the second relay lens. The advantage of this arrangement is that the functional part of the optical elements are on the axis corresponding to a central light ray.

Depending on the application an NLOSS may be used with optics having optical gain differing by several orders of magnitude. For example in welding, small area objectives would be suitable since a reduction in apparent brightness of a field might be acceptable. On the other hand when observing a scene in moderate to low level illuminating conditions, high optical gain optics may be used. Bright sources to be dealt with may be known; thus their characteristic emission may be beneficially modified by auxiliary optical components prior to or after impinging on an NLOSS, or the NLOSS may be designed to provide optimized performance with a particular known source or potential unknown sources. In the case of laser hazards the range of intensities encountered by an NLOSS may span several orders of magnitude, so that the NLOSS may function as a reversible switch for moderately high intensity beam and as a sacrificial element (locally damaged scattering screen) for a very high intensity beam.

Figure 5:
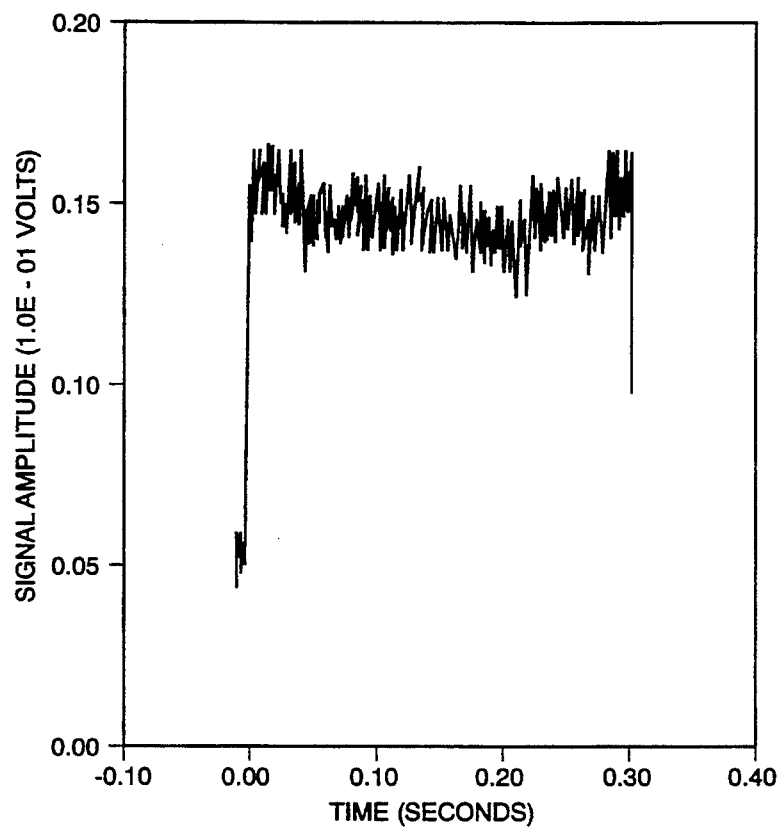
FIG. 5 is a graph showing the variation as a function of time a detector response to backscattered radiation from a 25 micron diameter portion of an NLOSS which was irradiated by a 105 mW laser at 1064 nm for 0.3 s.
Figure 6:
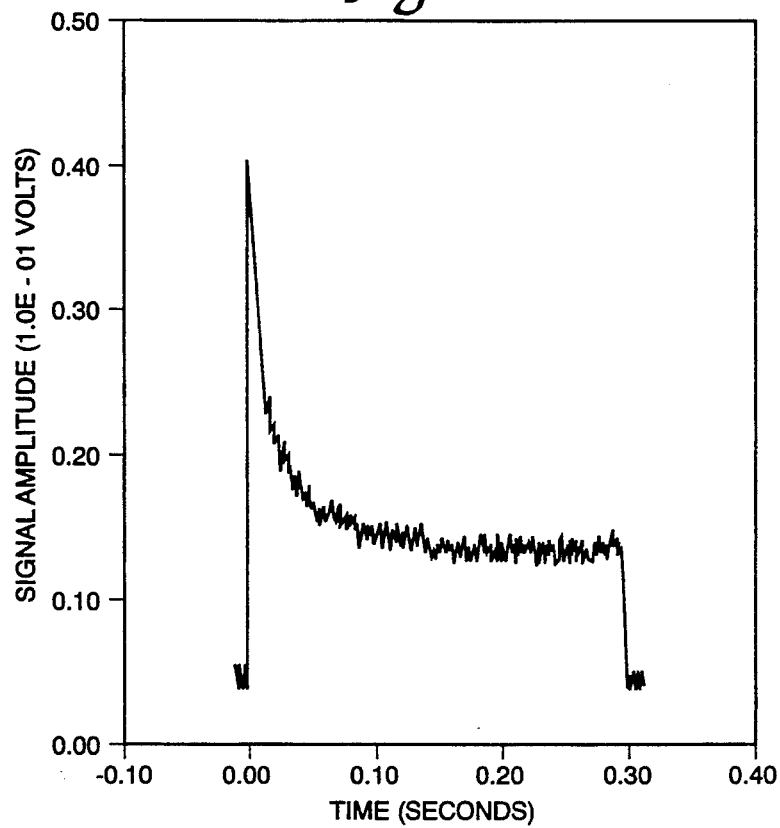
FIG. 6 is a is a graph showing the measured backscattered radiation as a function of time from the same NLOSS which was irradiated by a 260 mW laser at 1064 nm with a 25 micron spot—the backscatter rapidly decreases during the 5–10 ms following the onset of irradiation.

FIGS. 5 and 6 illustrate the results of a test of the NLOSS concept utilizing a 25 micron thick scattering layer formed from a mixture of 70% Norland 60 polymer and 30% E7 nematic liquid crystal. After being placed between two indium-tin-oxide coated glass slides, the mixture was cured under a UV lamp with an intensity of about 1 mW/cm$^2$. This particular scattering layer, having been cured with an ultraviolet lamp rather than a laser, probably has a microstructure similar to that of the 33% E7/N60 shown in FIG. 1$b$. This supposition is deduced from FIGS. 21 and 22 of the Sansone report, supra. Either the spherical or the more irregular liquid crystal inclusions can be produced in the polymer matrix and with a size range that provides for near optimum visible light scattering and a high resolution scattered image of a scene. The theoretical dependence of light transmission through a scattering film on the parameters, depth of film, number density of inclusions, light wavelength, inclusion radius and refractive index difference is shown and discussed by J. W. Doane in "Liquid Crystals Applications and Uses," Vol. 1, B. Bahadur, Ed., pp 361–395, "Polymer Dispersed Liquid Crystal Displays," the teachings of which are incorporated herein by reference. Also discussed by Doane and by W. C. O'Mara in "Liquid Crystal Flat Panel Displays—Manufacturing Science and Technology," Section 1.5.4 (VanNostrand-Reinhold, 1993), are issues concerning contrast and resolution for projection and direct viewing PDLC based viewing systems.

FIG. 5 is a graph showing a detector response to backscattered radiation as a function of time from an NLOSS which was irradiated by a 105 mW laser with a 25 micron diameter spot (where the diameter is defined as the distance between points where the intensity of the laser was $1/e^2$ times its maximum) at 1064 nm for 0.3 seconds. A portion of the backscattered laser light was collected using an off-axis lens and focused onto a photodiode. The backscatter was monitored as a function of time during the irradiation period and the photodiode response was captured using a digital oscilloscope. The heating effect of the laser was not enough to cause the phase change in the liquid crystal which would have brought it into its transmissive state. Hence, the magnitude of the scattered radiation was constant throughout the duration of the laser pulse.

FIG. 6 is a graph showing a detector response to backscattered radiation from the same NLOSS as a function of time when it was irradiated by a 25 micron spot from a 260 mW laser at a wavelength of 1064 microns. The difference caused by the greater irradiating power should be noted. Here, after an initial rise in the backscattered radiation, the backscatter rapidly decreased over the next 5 ms to a much lower value. This decline in the scattering was caused by the NLOSS being heated by the more intense laser radiation (as a result of absorption in the ITO film) to a temperature above that required for the liquid crystal nematic to isotropic phase change.

While particular embodiments have been described in detail hereinabove, the present invention is not limited to the particular embodiments as described. Many obvious variations and modifications can be made and are intended to be within the scope of the present invention as defined by the appended claims.

We claim:

1. An apparatus for viewing a scene wherein the brightness of a portion of the scene exceeds a threshold value of brightness, comprising:
   (a) a light receiving and nonlinear scattering layer having a coefficient of scattering that decreases when intensities of incident light are at and above the threshold value, whereby light from that portion of the scene exceeding the threshold value and scattered from that surface is reduced in intensity; and
   (b) means for imaging the scene scattered by the scattering layer onto an optical sensor or an eye of an observer.

2. The apparatus of claim 1 further comprising light collecting optics means for focusing the scene onto the nonlinear scattering layer.

3. The apparatus of claim 2 wherein the apparatus further comprises means for absorbing light transmitted by the nonlinear scattering layer.

4. The apparatus of claim 3 wherein the apparatus further comprises means for dissipating heat produced by light absorbed by the light absorber means.

5. The apparatus of claim 1 wherein the nonlinear scattering layer comprises a first transparent material within a matrix of a second transparent material; the first and second materials having dissimilar refractive indices at relatively low intensities of incident light, whereby the layer scatters low intensity incident light, and the first and second materials having similar refractive indices at relatively high intensities of incident light, whereby the layer is substantially transparent to high intensity incident light and the scattering of high intensity incident light is greatly reduced.

6. The apparatus of claim 1 wherein the means for imaging the scene scattered by the scattering layer comprises a concave mirror or alternatively a collecting lens, together with an eyepiece lens positioned so as to relay an upright real image to the eye of the observer or to another optical sensor.

7. The apparatus of claim 1 wherein the means for imaging the scene scattered by the scattering layer comprises a concave mirror or alternatively a collecting lens, and an optical detector located coincident with the image focused by the concave mirror or collecting lens.

8. The apparatus of claim 2 wherein the means for focusing the scene onto the nonlinear scattering layer comprises a concave mirror or an objective lens.

9. The apparatus of claim 8 wherein a central portion of the concave mirror is missing whereby light may be transmitted to or from a collecting optic.

10. The apparatus of claim 2 wherein the means for focusing the scene onto the nonlinear scattering layer comprises an objective lens and a beam splitter positioned between the objective lens and the nonlinear scattering layer such that the portion of light scattered by the scattering layer, to be reimaged at an optical detector or eye of an observer, is collected about a solid angle centered on a normal to the scattering layer and in which a central ray passes through the center of all focusing optical elements.

11. The apparatus of claim 2 wherein the apparatus includes a second layer in thermal contact with the scattering layer through which the incoming light must pass before striking the scattering layer; such second layer being sufficiently transparent to light that the imaging of the scene onto the optical sensor is substantially unimpaired but sufficiently absorbing of light to efficiently heat that portion of the scattering layer which is exposed to relatively high intensity light.

12. The apparatus of claim 1 wherein the nonlinear scattering layer comprises a first transparent material within a matrix of a second transparent material; with either the first or the second material having a transition temperature between two states characterized by different refractive indices, such that: (i) the first and second materials have substantially dissimilar refractive indices when and where the temperature is below the transition temperature, and (ii) the first and second materials have substantially similar refractive indices when and where the temperature is above the transition temperature.

13. The apparatus of claim 12 wherein the apparatus includes an additional layer in thermal contact with and passing the incident light before it strikes the scattering layer, or an additional layer in thermal contact with a downbeam side of the scattering layer, or additional layers in thermal contact with both sides of the scattering layer; the additional layer or layers being sufficiently transparent to light that the imaging of the scene onto the optical sensor is substantially unimpaired as a result of encountering the second layer and being sufficiently absorbing of light initially to efficiently heat an adjacent portion of the scattering layer when exposed to high intensity light until the temperature of that portion of the scattering layer reaches a transition temperature for the scattering layer.

14. The apparatus of claim 13 wherein the additional layer or layers consists of a metal or oxide conductor such as gold, aluminum, or indium-tin-oxide.

15. The apparatus of claim 13 wherein the additional layer or layers consists of or includes a material which has decreasing absorption or reflection with increasing temperature such as copper sulfide.

16. The apparatus of claim 1 wherein the scattering layer comprises a nematic liquid crystal, having a nematic to isotropic transition temperature, dispersed in droplets throughout a polymer matrix such that the refractive index of the nematic liquid crystal: (i) substantially differs from the refractive index of the polymer matrix when the temperature of the liquid crystal is below the transition temperature, and (ii) substantially matches the refractive index of the polymer matrix when the temperature of the liquid crystal is above the transition temperature.

17. The apparatus of claim 12 wherein an absorber material such as carbon black, or one or more dye(s) having selective absorption bands, or a reversible-bleachable thermochromic or reversible photochromic-thermally-bleachable absorber such as spiropyran is dispersed in the scattering layer.

18. The apparatus of claim 4 wherein the means for dissipating heat comprises a heat sink means or heat exchanger means in thermal contact with the light absorber means.

19. A method for viewing a scene where a portion of the scene exhibits excessive brightness, comprising:
  (a) scattering light originating from the scene off of a scattering film; where said scattering film has an optical scattering coefficient which decreases with increasing light intensity, whereby the intensity of light scattered originating from a source brighter than a remainder of the scene is reduced relative to light scattered from the remainder of the scene; and
  (b) reimaging an image scattered by the scattering film onto an optical sensor.

20. The method of claim 19 further comprising the step of absorbing light transmitted through the scattering layer.

21. The method of claim 20 further comprising the step of dissipating heat produced by the absorption of the light transmitted through the scattering layer.

* * * * *